Figure 1:
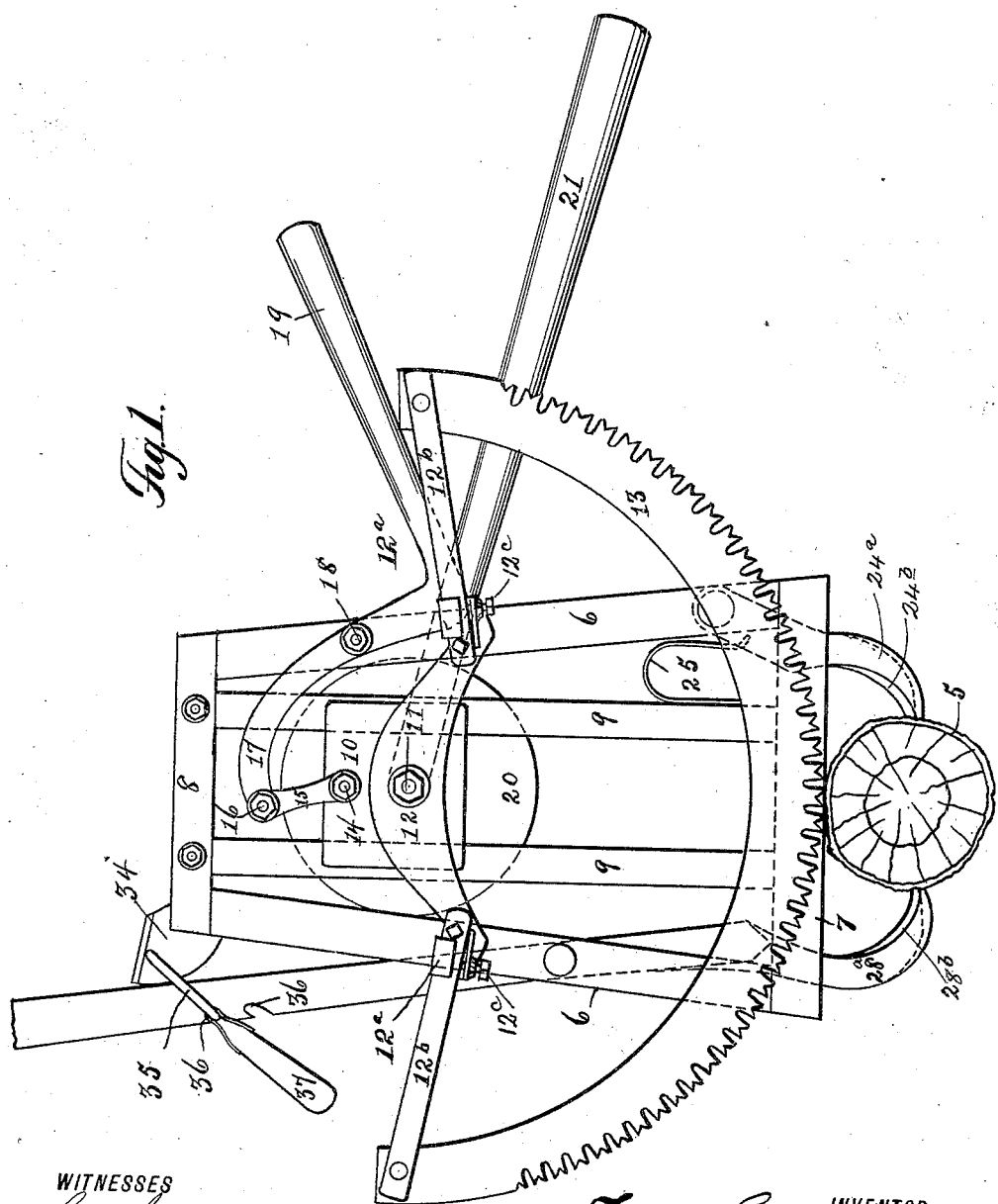

No. 689,013.　　　　　　　　　　　　　　Patented Dec. 17, 1901.
F. LINQUIST.
SAWING APPARATUS.
(Application filed Feb. 26, 1901.)

(No Model.)　　　　　　　　　　　　　　　　2 Sheets—Sheet 1.

WITNESSES　　　　　　　　　　　　　INVENTOR
　　　　　　　　　　　　　　　BY　Frank Linquist
　　　　　　　　　　　　　　　　　Edgar Tate
　　　　　　　　　　　　　　　　　　　　　ATTORNEYS No. 689,013. Patented Dec. 17, 1901.
F. LINQUIST.
SAWING APPARATUS.
(Application filed Feb. 26, 1901.)
(No Model.) 2 Sheets—Sheet 2.

WITNESSES

INVENTOR
Frank Linquist
BY
ATTORNEYS

UNITED STATES PATENT OFFICE.

FRANK LINQUIST, OF BROOKLYN, NEW YORK.

SAWING APPARATUS.

SPECIFICATION forming part of Letters Patent No. 689,013, dated December 17, 1901.

Application filed February 26, 1901. Serial No. 48,897. (No model.)

*To all whom it may concern:*

Be it known that I, FRANK LINQUIST, a citizen of the United States, residing at Brooklyn, in the county of Kings and State of New York, have invented certain new and useful Improvements in Sawing Apparatus, of which the following is a full and complete specification, such as will enable those skilled in the art to which it appertains to make and use the same.

This invention relates more particularly to that class of sawing-machines which are adapted for mounting in operative relation to a log or tree; and it has for its object to provide a simple, cheap, readily-constructed, and perfectly-operating device of this character capable of being worked by a single operator and carried by him from one tree or log to another, capable of being easily attached to and detached from trees or logs of various diameters, and capable of utilizing the full power of the operator to attain the most effective results.

With these and other ends in view my invention consists, primarily, of a frame provided with manually-operated means for connecting it to a tree or log and constructed with a longitudinally-sliding saw-carrier, a segmental saw provided with operating-levers mounted in mutual relation whereby to be manipulated both by one operator and respectively connected the first to the sliding saw-support, whereby to hold the saw in constantly-operative relation to the tree or log as it from time to time cuts thereinto, and the other connected to the pivot or fulcrum of the saw, whereby to manipulate or reciprocate the same.

Secondarily, my invention consists of such a device having connecting or attaching means and a longitudinally-sliding saw-carrier and saw-blade connected therewith and provided with a lever or handle connected at one end to a pivoted curved arm or crank-lever, which has its opposite end pivoted to a link connected with the saw-carrier for the purpose of manipulating the said saw-carrier readily and effectively with one hand, and a disk mounted upon the pivot or fulcrum of the saw beneath the framework of the device and having an extended operating-lever connected therewith and which is adapted for operation in a segment of movement parallel to the segment of movement of the saw-blade.

Tertiarily, my invention consists in the improved means I employ for connecting the device to trees or logs of different diameters and quickly disconnecting the same therefrom, and, finally, my invention consists in the novel construction, arrangement, and combination of parts hereinafter fully described and claimed.

Figure 2:
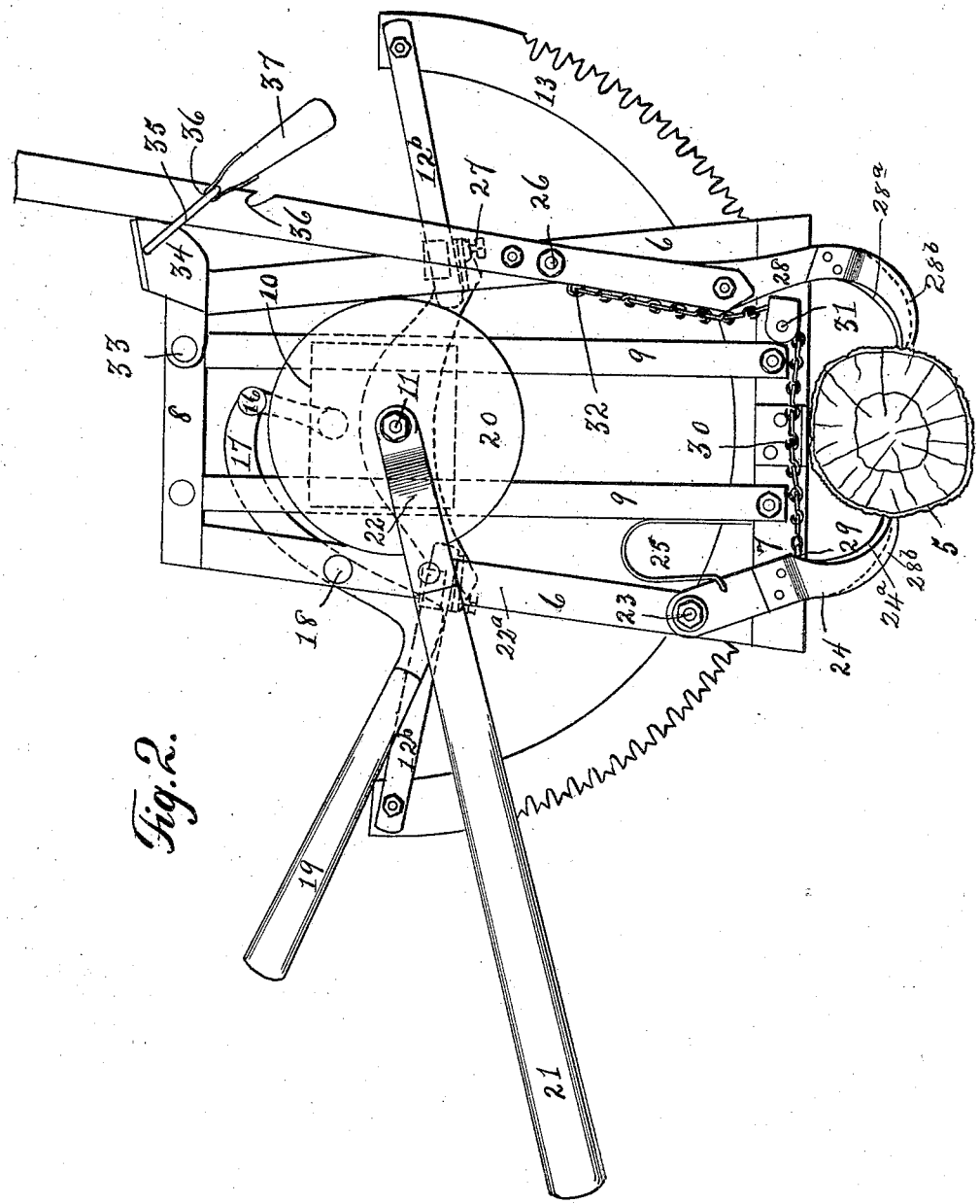

In the accompanying drawings, in which like numerals of reference designate corresponding parts in both views, Figure 1 is a plan view of a device embodying my invention, and Fig. 2 is an inverted plan view thereof.

In the practice of my invention I construct a frame composed of longitudinal side bars 6, connected by cross-bars 7 and 8 at either end thereof, between which cross-bars are secured longitudinal bars or guides 9, which range parallel with each other. Between the longitudinal guides 9 I mount a sliding saw carrier or block 10, the ends or sides of which embrace the said guides, to be thereby retained in position. In this carrier or block 10 is mounted a shaft 11, which extends entirely therethrough. Upon one end of the shaft is mounted a transversely-ranging segmental cross-head 12, rigidly secured thereto and provided at the opposite ends thereof with clamps $12^a$, through which are inserted arms $12^b$, secured therein by set-screws $12^c$. These arms $12^b$ are slightly backwardly directed, and to the outer ends thereof I rigidly secure the rear ends of a segmental or semicircular saw-blade 13. To the sliding carrier or block 10 upon the same surface thereof on which the cross-head 12 is mounted I pivotally connect, by means of a pivot 14, a link 15, to the opposite end of which I pivot at 16 a curved arm or crank-lever 17, which is pivoted in the longitudinal bar 6 at 18. The free end of this arm or crank-lever 17 projects forwardly or in the direction of the saw when the latter is in the retracted position and has secured or formed integrally thereon a handle 19, projecting substantially at right angles thereto. The construction of the link and crank-lever and the handle and their pivotal relations are such that when the saw is projected to the edge of the cross-bar 7, which, as shown in Fig. 1, contacts with the log or tree, the handle 19 projects almost at right angles to the longitudinal bar 6 and reaches a right angle as the saw is further projected beyond the edge of the cross-bar 7. To the opposite end of the shaft 11 upon the opposite side of the frame is rigidly mounted a disk or wheel 20, and to this disk or wheel I secure a lever 21 at such angles as will cause it to project radially in a line from its shaft or pivot approximately to the end of the saw-blade 13 and upon the same side of the frame as the handle 19 and in proximity thereto. The disk is provided with a radial arm 22, which projects from the center thereof outwardly to beyond its periphery and lies parallel with its face. The lever 21 is rigidly secured to the outer end of this radial arm by means of a bolt.

Upon one of the longitudinal bars 6, adjacent to the cross-bar 7, is pivoted a link or lever 24, formed with an integral claw $24^a$, upon which is superposed a supplemental claw $24^b$, which does not exactly aline with the main claw $24^a$ and is adapted, together therewith, to engage the log or tree 5. Upon one of the longitudinal bars 9 is secured a U-shaped spring 25, having one end thereof outwardly turned and inserted in the link 24 to force it normally outwardly. Upon the opposite bar 6 is pivoted at 26, somewhat near the center thereof, a lever 27, in one end of which is secured an arm 28, formed with a claw $28^a$ and provided with a supplemental claw $28^b$, secured upon the same similarly to the arrangement of the claws $24^a$ and $24^b$. To the claw $24^a$ I secure at 29 a chain 30, which extends along the cross-bar 7 around a pulley 31, which I journal upon the said cross-bar 7. The chain then extends rearwardly toward the pivotal point of the lever 27 and is secured to a loop or eye 32 thereon. Upon the cross-bar 8 I pivot at 33 a cam-block 34, formed with a curved face, against which the lever 27 bears, and provided with a link 35, which surrounds the said lever 27 and enters notches or recesses 36 therein. Upon this link is pivotally mounted a handle 37, which operates as a lever in forcing the link downwardly or forwardly of the said handle to cause it to engage in one of the notches or recesses. It will be seen that the levers 19 and 21 range both at one side of the frame, respectively, from the upper and lower faces thereof, and the lever 27 ranges longitudinally at the opposite side, and that all three levers range parallel with the plane of the saw.

The operation of my newly-invented sawing-machine will be readily understood from the foregoing description, taken in connection with the accompanying drawings, and the advantages resultant from the use thereof will be manifest to all who are conversant with devices of this character. The device is self-sustaining upon a log or tree, is portable, and does not require any supports or standards for holding it in position. If the log or tree 5 shown in the drawings be an erect body or in a vertical position, as is customary with trees or piles, the device when connected thereto as shown in Figs. 1 and 2 will project horizontally therefrom. If the log be laid upon the ground, then the device of course projects vertically therefrom. Either side of the device may, moreover, be considered the top or the bottom relatively to its horizontal position; but the right or left is in the vertical position determinate, since both the handles or levers 19 and 21 project from the same side. In the horizontal position I prefer that the saw should be on top.

The device is applied to a tree or log by throwing the handle 37 of the link 35 rearwardly or away from the saw, thereby removing the link from the notch 36, and by moving the said link rearwardly the blade is pulled out of the lever 27. By moving the lever 27 inwardly or toward the frame of the machine the claws $28^a$ and $28^b$ are projected outwardly and the claws $24^a$ and $24^b$ will similarly be projected outwardly by the spring 25. The cam 34 must first be swung upwardly to prepare for the inward movement of the lever 27. The device is then moved toward a tree or log until the front edge of the cross-bar 7 abuts against the same, whereupon the lever 27 is swung outwardly upon its pivot 26, thereby moving its forward end inwardly and taking up the slack of the chain 30 and so tightening it as to pull the claws $24^a$ and $24^b$ against one side of the tree or log 5 and project the said claws thereinto against the tension of the spring 25. At the same time the movement of the lever forces the claws $28^a$ and $28^b$ upon its arm 28 inwardly into the opposite side of the tree or log 5. The pivoted cam 34 being then drawn down forces the lever outwardly and binds it immovably in position and draws the chain tightly to the greatest possible extent and digs all four of the claws into the wood with great firmness, and upon drawing down the link and seating it in the notch 36 the cam is prevented from slipping and the whole device is held in effective position. It is an important advantage of my invention that it is thus self-adjustable to a tree or log. It does not require any standards or supports to hold in on the ground. The coördination of the parts gives five effective points of engagement of the device with the tree or log, one being the front of the frame or cross-bar 7 and the others being the points of the four claws $24^a$, $24^b$, $28^a$, and $28^b$, and the claws each grasp the same in two points at either side thereof, so that the said tree or log is clutched and the device bound against the same by pressure on three sides thereof at five points. This enables my sawing-machine to be connected instantly to any tree or log and to retain itself in connection therewith and makes it a portable machine, which can be carried around by hand. In conjunction with the rest of the mechanism it enables my invention to comprise a sawing-machine capable of manipulation by one operator. After the machine has been duly applied to the tree or log the operator stands at the side of the frame from which both handles or levers 19 and 21 project. With one hand he grasps the lever 19 and bears against the same to move the sliding saw-carrier forwardly in its guides 9, whereby to cause the teeth of the saw to bear against the wood with such a degree of pressure as may be desired. With the other hand the operator grasps the handle or lever 21 and operates it back and forth, thereby reciprocating the saw in a segmental line of movement back and forth against the tree or log to cut into the same. The operator may brace himself against the one handle 19 and use the full force of his other arm upon the operating-handle 21. He may also when he finds the cutting easy bear with greater force upon the lever 19 to hold the saw more tightly against the tree or log and cut deeper into the wood and finish the job more quickly. When any portion of the wood is felt by the hand in operating the handle 21 to be harder to cut and it is found more difficult to reciprocate the saw, he will bear with less force upon the handle. Frequently in sawing wood such hard portions will be encountered, and upon the saw-operating hand feeling the teeth of the saw strike against a knot or other tough portion the other hand of the operator will almost instinctively relieve the pressure upon the handle 19. The connection of the operating-lever with the central shaft or pivot of the saw-blade enables it to work the saw positively and forcibly, and as it projects radially from this center of the saw, beneath one end of the blade and beyond the same, a considerable leverage is acquired, and considerable energy is imparted to the saw at each stroke of the operating-lever 21. The handle or lever 19 being on one face of the frame and the operating-lever 21 being beneath it on the other face, the said operating-lever 21 clears the hand and arm which hold the lever 19, and this operating-lever 21 is considerably longer than the handle or lever 19 and projects appreciably beyond the same, which permits the hand upon the end of the said operating-lever 21 to clear the handle or lever 19 outwardly thereof and also gives a considerable leverage. Thus by the arrangement of the saw and of these levers relatively thereto full force and power are given to the saw, and one operator may grasp both levers and work the saw with perfect facility and mechanical grace or economy of motion. Moreover, the arrangement of the cross-head 12 and of the rearward projection of the arms 12$^b$ gives a large sweep or considerable area of effective contact to the saw and mounts it rigidly, so as to bear strongly against the work. The arms 12$^b$ may be adjusted in the clamps 12$^a$ so as to keep the saw-blade perfectly and accurately tight, and the set-screws 12$^c$ will hold the said arms in their adjusted position.

Having thus fully described my invention, what I claim as new, and desire to secure by Letters Patent, is—

1. A portable sawing-machine, comprising a frame provided with manually-operated means for connecting it to a tree or log, a longitudinally-sliding saw-carrier mounted centrally in the said frame, a segmental saw carried by the saw-carrier, and mounted upon a pivot extending through the same, and operating-levers upon the opposite faces of the frame, projecting both from one side of the said frame, the upper lever being connected to the saw-carrier and adapted to slide the same and the saw toward the work by the pressure of the hand of the operator, and the lower lever having one end connected with the pivot of the saw beneath the saw-carrier and projecting beyond the upper lever whereby it may be manipulated by one hand of the operator, while the upper lever is held by the other.

2. A portable sawing-machine, comprising a frame provided with manually-operated means for connecting it to a tree or log and for sustaining it in the connected position, and formed centrally with longitudinal guides; a saw-carrier sliding in the said guides, a segmental saw connected therewith, a curved arm pivoted on the top of the frame and provided at one end with an outwardly-ranging handle projecting beyond the frame at one side, and the opposite or inner end of the curved arm being pivoted to a link connected to the saw-carrier, rearwardly of the saw-blade, a shaft or pivot inserted through the said saw-carrier and comprising the fulcrum of the saw, and projecting downwardly beneath said saw-carrier, a disk rigidly mounted upon the lower end of the said shaft or pivot, an operating-lever secured to the said shaft and to the said disk and projecting beneath the frame of the machine, and at the same side as the upper lever and radially with respect to the saw-blade, whereby a single operator may with one hand work the upper lever to hold the saw-blade in effective contact with the matter operated upon, with the desired pressure, and may with the other hand operate the lower lever back and forth to reciprocate the saw-blade without interference of the two levers with each other or with the hands of the operator.

3. A portable sawing-machine, comprising a frame composed of longitudinal bars connected by cross-bars at the front and rear and provided with longitudinally-arranged manually-operated means for connecting the frame to a tree or log, the said means being adapted to be operated from the rear of the frame, and including devices projecting from the front of the frame and adapted to bind the said cross-bars against the tree or log and maintain the frame in position upon the tree or log without other supports; a longitudinally-sliding saw-carrier mounted centrally in the frame, a segmental saw carried by the saw-carrier, and having its pivot or fulcrum projected therethrough, and operating-levers upon the opposite faces of the frame and projecting outwardly therefrom, the upper lever being connected to the saw-carrier and adapted to slide the same toward the work by the pressure of one hand of the operator and the lower lever having one end connected with the pivot of the saw beneath the saw-carrier and adapted to be manipulated by the other hand of the operator while he is holding or pressing the upper lever.

4. A portable sawing-machine, comprising a frame composed of longitudinal bars connected by cross-bars at front and rear and provided with longitudinally-arranged manually-operated means for connecting the frame to a tree or log, the said means being adapted to be operated from the rear of the frame and including devices projecting forwardly from the front cross-bar of the frame and adapted to bind said cross-bar against the tree or log and maintain the frame in position upon the tree or log without other supports; a longitudinally-sliding saw-carrier mounted centrally in the said frame, a segmental saw connected therewith, a curved arm pivoted on the top of the frame and provided at one end with an outwardly-ranging handle projecting beyond the frame at one side and the opposite or inner end of the curved arm being pivoted to a link connected to the saw-carrier rearwardly of the saw-blade, a shaft or pivot inserted through said saw-carrier and comprising the fulcrum of the saw and projecting downwardly beneath the said saw-carrier, a disk rigidly mounted upon the lower end of the said shaft or pivot, an operating-lever secured to said shaft and to said disk and projecting beneath the frame of the machine at the same side as the upper lever and radially with respect to the saw-blade, whereby a single operator may with one hand work the upper lever to hold the saw-blade in effective contact with the matter operated upon, with the desired pressure, and may with the other hand operate the lower lever back and forth to reciprocate the saw-blade without interference of the two levers with each other or with the hands of the operator of the device.

5. A portable sawing-machine, comprising a frame formed of longitudinal bars connected with cross-bars at front and rear and provided with longitudinally-arranged manually-operated means for connecting the frame to a tree or log, the said means being adapted to be operated from the rear of the frame, and including devices projecting forwardly from the front cross-bar of the frame, and adapted to bind said cross-bar against the tree or log and maintain the frame in position upon the tree or log without other supports; a longitudinally-sliding saw-carrier mounted centrally in the said frame, a lever pivoted upon one face of the frame and projecting from one side thereof and connected to the saw-carrier to slide the same, a shaft extending through the said saw-carrier, a disk mounted upon the lower end of the said shaft, a handle or operating-lever secured to the said shaft and to the said disk and projecting from the lower face of the frame beyond the same side thereof, whereby a single operator may manipulate the saw-sliding lever with one hand and the saw-operating lever with the other hand, a cross-head mounted upon the upper end of the shaft and provided at each end thereof with clamps having set-screws therein, radially-extending bars mounted in the said clamps and secured therein by said set-screws, and a segmental saw-blade secured to the outer ends of the said arms.

6. A portable sawing-machine, comprising a flat frame composed of longitudinal bars, cross-bars connecting the same at either end and longitudinal center bars forming guides, a saw-carrier sliding in the said guides, a segmental saw mounted in the said carrier, a saw-sliding lever pivoted upon one face of the frame and connected with the saw-carrier and projecting outwardly from one side of the frame, a second lever secured to the pivot or fulcrum of the saw upon the opposite face of the frame and projecting from the same side as the first lever and beneath and beyond the same, whereby a single operator may press against the saw-sliding lever with one hand and reciprocate the operating-lever with the other hand; a third lever pivoted on the under face of the frame at the opposite sides thereof and projecting rearwardly, and attaching means projecting from the front of the frame and beneath the same and connected with the latter lever and comprising devices adapted to clutch a tree or log and bind it against the front cross-bar of the frame whereby to secure and retain the said frame in position thereon without other supports.

7. A portable sawing-machine, comprising a frame, a saw-carrier sliding longitudinally therein, a segmental saw mounted upon the said saw-carrier and having its pivot or fulcrum projecting therethrough, operating-levers connected respectively with the said saw-carrier and with the said pivot or fulcrum upon opposite faces of the frame, and projecting both from one side thereof, whereby a single operator may with one hand press against the saw-sliding lever and with the other reciprocate the operating-lever of the saw; a longitudinally-extending lever pivoted upon the face of the frame opposite to that swept by the saw, and extending rearwardly, and swinging laterally with respect thereto and provided with means mounted upon the frame for binding it in a laterally-adjusted position, a claw mounted upon the working end of the lever and projecting beyond the front of the frame and provided with a supplemental claw secured thereto and both adapted to be projected into a tree or log by the said lever, a claw pivoted upon the opposite side of the frame and having a similar supplemental claw rigidly secured thereto, a chain secured to the said pivoted claw and ranging along the front of the frame, a pulley on said frame around which the chain passes, the said chain extending along the lever and being secured thereto, whereby all four claws are simultaneously projected into the tree or log at either side thereof to bind the front of the frame thereagainst and retain the same in position thereon without other supports, and a spring bearing against the pivoted claw to release all of the claws from the tree or log when the lever is released from its adjusted position.

8. A portable sawing-machine, comprising a frame adapted to be connected to a tree or log at right angles thereto and provided with clutching devices for engaging the said tree or log, a sliding saw-carrier longitudinally movable in said frame, a segmental saw-blade pivotally mounted in said saw-carrier; and three levers lying parallel with the plane of the frame; one of the levers being pivoted on one face of the frame and projecting from one side thereof and being pivotally connected to the saw-carrier and adapted to press the same in the direction of the tree or log with one hand of the operator; a second lever projecting from the opposite face of the frame on the same side; and being connected to the pivot or fulcrum of the saw to operate the same by the other hand of the operator; and the third lever being pivoted upon the same face of the frame as the operating-lever at the opposite side and connected to the clutching means for holding the frame to the tree or log, and being provided with means for holding it in the laterally-adjusted position.

9. A portable sawing-machine, comprising a frame provided with means for connecting it to a tree or log and for sustaining it in relation thereto; a saw-carrier longitudinally and freely slidable in the said frame, a saw-blade pivotally mounted in the saw-carrier, a lever connected with the pivot of the said saw-blade for reciprocating the same, a curved arm pivoted upon the frame and projecting inwardly thereof and pivotally connected by a link to the rear of the carrier, and provided at its forward end with an outwardly-ranging handle or lever, whereby as one hand of the operator reciprocates the saw the other hand grasps the other lever to manipulate the saw-carrier and work it back and forth as may be required so as to press it with greater or less degree of force against the work at each stroke of the saw.

10. A portable sawing-machine, comprising a frame composed of longitudinal bars connected by cross-bars at the front and rear and provided with longitudinal center bars forming guides, a longitudinally-arranged lever pivoted upon one of the longitudinal bars at one side of the frame, upon the under face thereof, and provided with a claw projecting beyond the front cross-bar of the frame, and having a supplemental claw secured thereto, a claw pivoted to the opposite longitudinal bar of the frame and provided with a supplemental claw secured thereto, a U-shaped spring mounted upon one of the longitudinal guides and having its free end inserted in the pivoted claw, a chain connected between the pivoted claw and its supplemental claw and ranging beneath the front bar of the machine, a pulley mounted upon said front bar near the working end of the device, around which said chain passes, said chain being extended upwardly along the said lever and secured thereto below its fulcrum-point, whereby when the lever is moved laterally of the frame, the chain is tightened and the four claws operated to clutch a tree or log and bind the front bar of the frame against the same, a pivoted cam mounted upon the rear of the frame and adapted to be brought downwardly against the lever to bind the same in its adjusted position, a link mounted in said cam and adapted to engage notches formed in the lever, a handle or lever pivotally connected to said link and adapted to operate the same to engage it in said notches and disengage it therefrom; a saw-carrier longitudinally and freely slidable in the guides of the frame, a shaft mounted therein and extending therethrough, a cross-head mounted upon the said shaft and provided at either end thereof with clamps having set-screws therein, radial arms adjustably mounted in said clamps and secured by the said set-screws, a saw-blade secured to the outer face of the said radial arms, a disk secured to the shaft beneath the saw-carrier and provided with a radial arm, a handle or lever secured to the said arm and projecting from the under face of the frame beyond one side thereof and adapted to be reciprocated by one hand of the operator, a curved arm pivoted upon the opposite face of the frame and projecting inwardly thereof, and provided with a link pivotally connected thereto and to the rear of the saw-carrier, and a handle or lever secured upon the outer end of the said arm and projecting outwardly from the same side of the frame as the operating-lever and adapted to be manipulated by the other hand of the operator, whereby to press the saw against the work with the desired degree of tension at each stroke of the saw, the said operating-lever being longer than the saw-sliding lever, and both levers projecting from the opposite faces of the frame whereby the hands of the operator clear said levers and one another in the operation of the device.

11. A portable sawing-machine, comprising a frame composed of longitudinal bars connected by cross-bars at the front and rear and provided with longitudinal center bars forming guides, a longitudinally-arranged lever pivoted upon one of the longitudinal bars at one side of the frame, upon the under face thereof, and provided with a claw projecting beyond the front cross-bar of the frame, and having a supplemental claw secured thereto, a claw pivoted to the opposite longitudinal bar of the frame and provided with a supplemental claw secured thereto, a U-shaped spring mounted upon one of the longitudinal guides and having its free end inserted in the pivoted claw, a chain connected between the pivoted claw and its supplemental claw and ranging beneath the front bar of the machine, a pulley mounted upon said front bar near the working end of the lever, around which said chain passes, said chain being extended upwardly along the said lever and secured thereto below its fulcrum-point, whereby when the lever is moved laterally of the frame, the chain is tightened and the four claws operated to clutch a tree or log and bind the front bar of the frame against the same, a pivoted cam mounted upon the rear of the frame and adapted to be brought downwardly against the lever to bind the same in its adjusted position, a link mounted in said cam and adapted to engage notches formed in the lever, a handle or lever pivotally connected to said link and adapted to operate the same to engage it in said notches and disengage it therefrom; a longitudinally-sliding saw-carrier mounted centrally in the said frame, a segmental saw carried by the saw-carrier, and mounted upon a pivot extending through the same, and operating-levers upon the opposite faces of the frame, projecting both from one side of the said frame, the upper lever being connected to the saw-carrier and adapted to slide the same and the saw toward the work by the pressure of the hand of the operator, and the lower lever having one end connected with the pivot of the saw beneath the saw-carrier and projecting beyond the upper lever whereby it may be manipulated by one hand of the operator, while the upper lever is held by the other.

12. A portable sawing-machine comprising a frame provided with manually-operated means for connecting it to a tree or log; a saw-carrier longitudinally and freely slidable in the guides of the frame, a shaft mounted therein and extending therethrough, a crosshead mounted upon the said shaft and provided at either end thereof with clamps having set-screws therein, radial arms adjustably mounted in said clamps and secured by the said set-screws, a saw-blade secured to the outer face of the said radial arms, a disk secured to the shaft beneath the saw-carrier and provided with a radial arm, a handle or lever secured to the said arm and projecting from the under face of the frame beyond one side thereof and adapted to be reciprocated by one hand of the operator, a curved arm pivoted upon the opposite face of the frame and projecting inwardly thereof and provided with a link pivotally connected thereto and to the rear of the saw-carrier, and a handle or lever secured upon the outer end of the said arm and projecting outwardly from the same side of the frame as the operating-lever and adapted to be manipulated by the other hand of the operator, whereby to press the saw against the work with the desired degree of tension at each stroke of the saw, the said operating-lever being longer than the saw-sliding lever, and both levers projecting from the opposite faces of the frame whereby the hands of the operator clear said levers and one another in the operation of the device.

In testimony that I claim the foregoing as my invention I have signed my name, in presence of the subscribing witnesses, this 21st day of February, 1901.

FRANK LINQUIST.

Witnesses:
F. A. STEWART,
L. R. BOYER.